May 19, 1959

J. W. PAULLUS 2,886,938

BALE BUNCHER

Filed May 24, 1957

INVENTOR.
James W. Paullus
BY
Greek Wells
Atty.

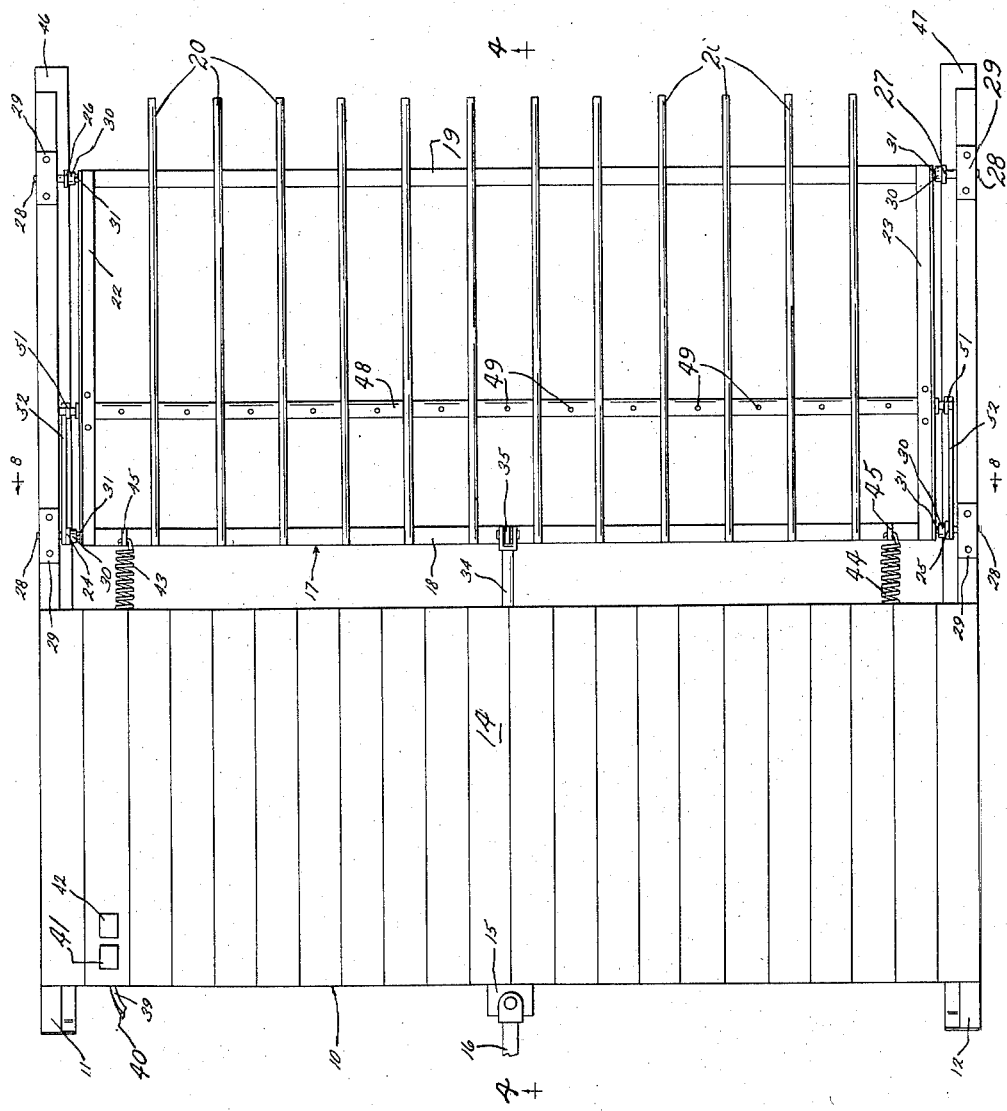

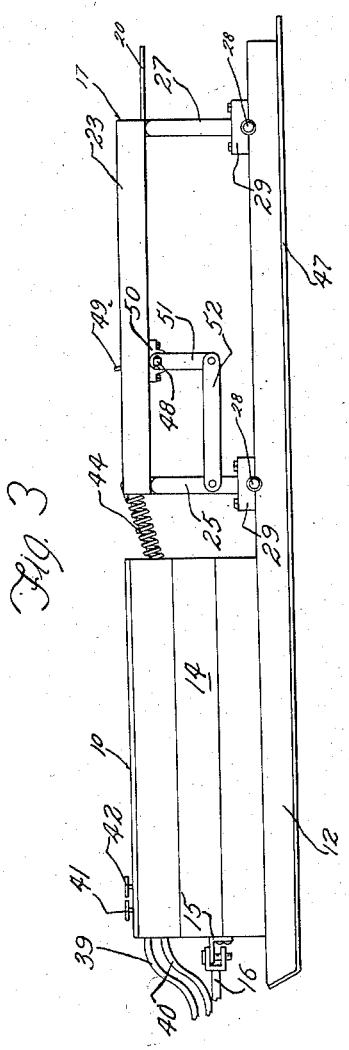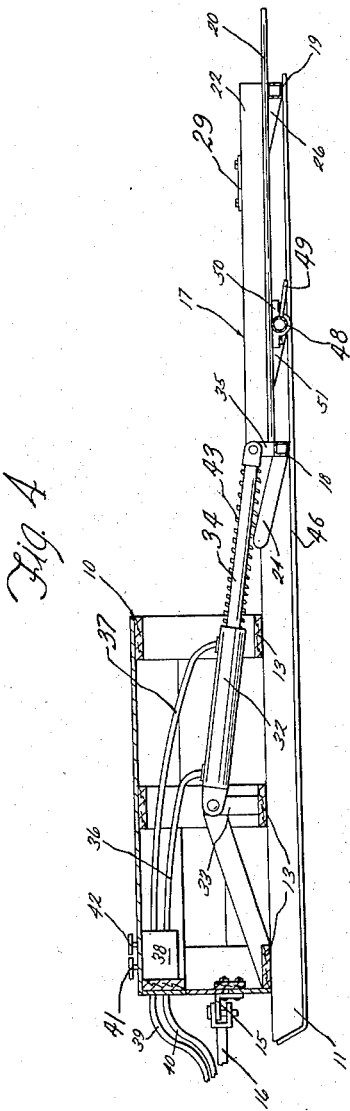

May 19, 1959 J. W. PAULLUS 2,886,938
BALE BUNCHER
Filed May 24, 1957 4 Sheets-Sheet 4
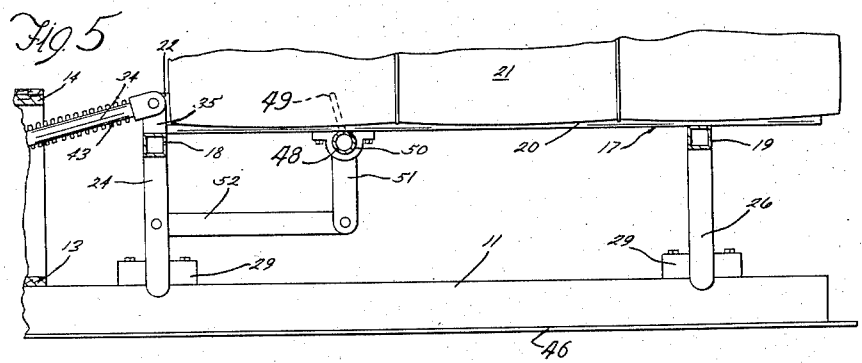
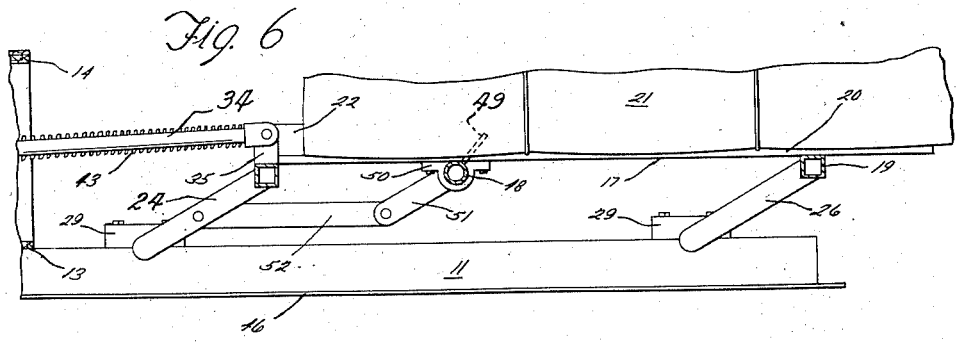
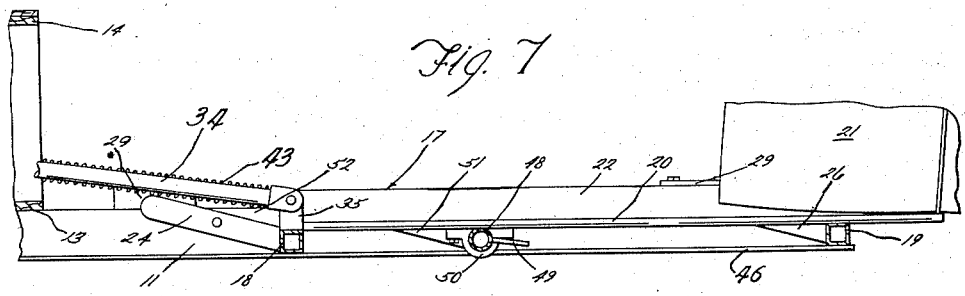
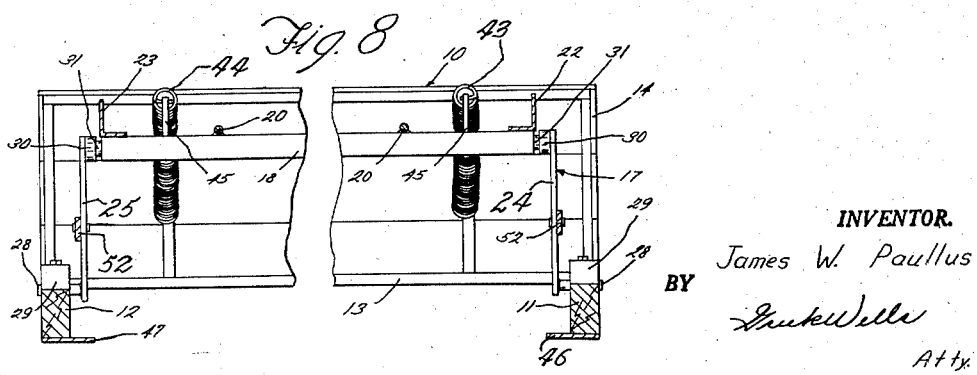
INVENTOR.
James W. Paullus
BY
Atty.

United States Patent Office 2,886,938
Patented May 19, 1959

2,886,938

BALE BUNCHER

James W. Paullus, Spokane, Wash.

Application May 24, 1957, Serial No. 661,329

3 Claims. (Cl. 56—474)

The present invention relates to improvements in devices for bunching hay bales.

In haying operations which include baling of the hay crop, the hay bales have in the past been dropped behind the baling machine as they were formed, and thus left scattered over the field to be picked up one at a time for transportation to the stack. In recent years, however, it has become common practice to gather these bales in bunches of ten or twelve and then to pick them up with a loading fork on a tractor and transfer them to the stack, if it is near by, or to the transporting unit. It has been found that such a method of handling the bales is considerably more economical and efficient. It is the principal purpose of this invention to provide a device which may be towed behind the baling machine to receive bales therefrom, and which may be used to gather bales into groups of ten or twelve and deposit these groups in stacks prepared for handling by the loading fork.

More specifically, it is the purpose of this invention to provide such a device which includes a bale receiving rack upon which bales can be placed in multiple layers, and that is adapted to be lowered from the loading position, down to the ground level to deposit the stacked bales on the ground without upsetting the stack.

Another purpose of the invention is to provide means on the rack to secure the bales against movement thereon while they are being stacked, but which is operable upon lowering of the rack, to release the bales to permit unloading.

The nature and advantages of my invention will appear more fully from the following description and the accompanying drawings wherein a preferred form of the invention is shown. It should be understood, however, that the drawings and description are illustrative only, and are not intended to limit the invention except insofar as it is limited by the claims.

In the drawings:

Figure 2 is a plan view of the invention;

Figure 3 is a view in side elevation of the invention;

Figure 4 is a longitudinal cross sectional view taken substantially on the line 2—2 of Figure 2, but showing the loading rack in lowered position;

Figure 5 is an enlarged fragmentary sectional view similar to Figure 4, but showing a bale in place on the loading rack;

Figure 6 is a view similar to Figure 5, but showing the rack being lowered;

Figure 7 is a view similar to Figure 5, but showing the rack in lowered position and showing the bales passing rearwardly therefrom; and Figure 8 is an enlarged sectional view of the machine taken substantially on the line 8—8 of Figure 2.

Figure 1:
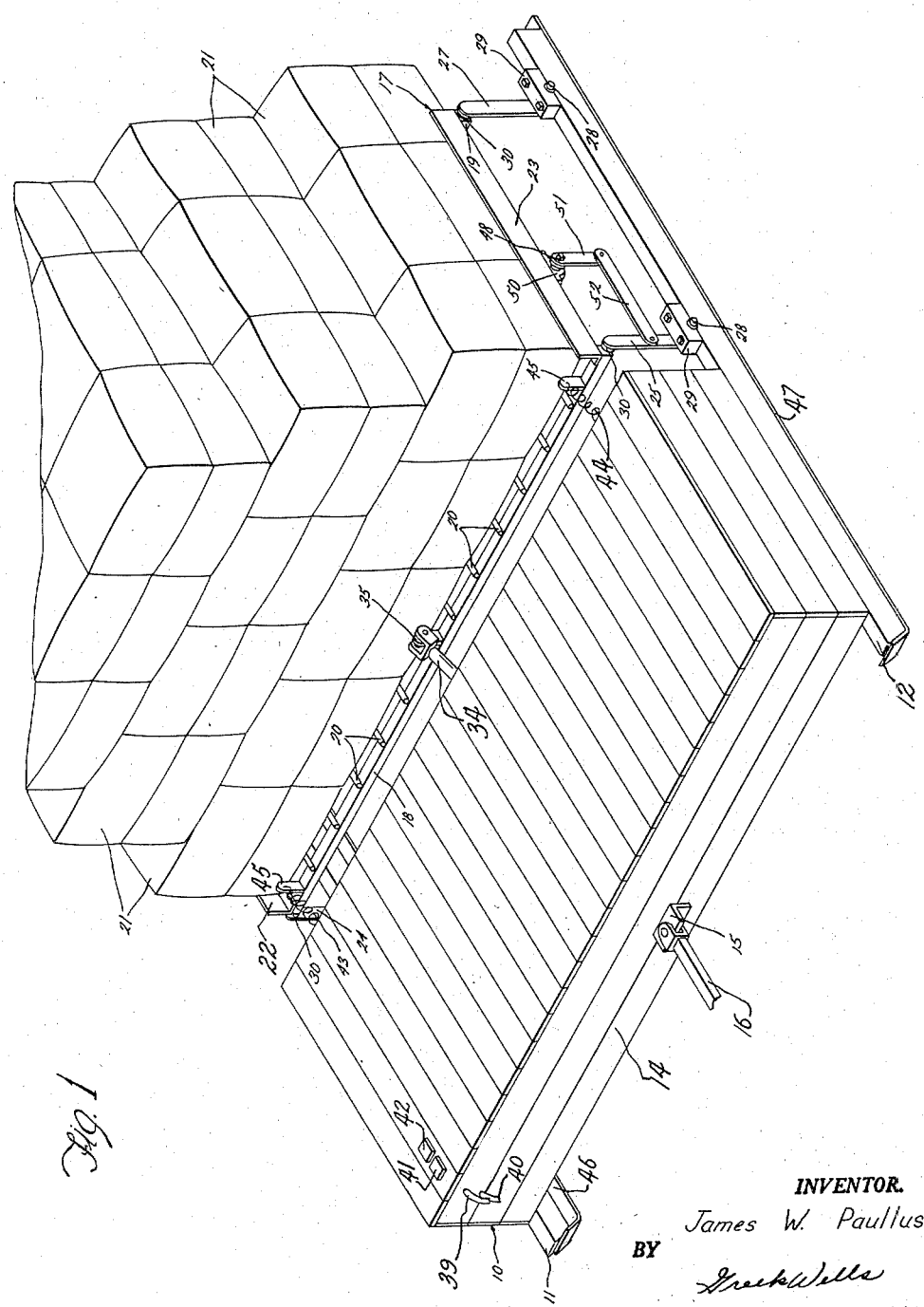
Figure 1 is a perspective view of my invention.

Referring now to the drawings, my invention is shown as embodied in a sled 10 which comprises a pair of spaced apart runners 11 and 12 tied together near their forward ends by suitable bracing members 13. A raised platform 14 is provided near the front of the sled 10 as shown in the drawings, the purpose of which will appear later herein. A drawbar hitch 15 is connected to the front of the platform 14 for connection to a drawbar 16 of a baling machine (not shown). The sled 10 is intended to be hauled behind the baling machine in a position to receive bales therefrom on the platform 14.

Behind the platform, a loading rack generally indicated by the numeral 17 is provided. The rack 17 comprises front and rear transverse frame pieces 18 and 19, which support a plurality of spaced apart longitudinal rods 20. The rods 20 extend the full distance between the frame pieces 18 and 19, and a short distance rearwardly beyond the rear frame piece 19. The rods 20 are preferably solid cylindrical rods. The rack 17 is adapted to receive and support hay bales such as indicated at 21 in the drawings, the bales 21 being stacked on the rods 20. Angle irons 22 and 23 are provided at the side edges of the rack 17 to confine bales 21 thereon.

The rack 17 is supported on the sled 10 by four pivotal links 24, 25, 26, and 27. The links 24—27 have outwardly extending horizontal stub shafts 28 fixed at their lower ends which are pivoted in wooden bearing members 29 attached to the tops of the runners 11 and 12. At their upper ends, the links 24—27 have short, inwardly extending sleeves 30 which rotatably receive shaft portions 31 which protrude from the opposite ends of the transverse frame pieces 18 and 19. With this construction, the rack 17 is mounted to the sled 10 for bodily movement downwardly and rearwardly between the sled runners 11 and 12. When the rack 17 is in its uppermost position, as shown in Figures 3 and 5, it is positioned at substantially the same level as the top of the platform 14 and immediately therebehind. When the rack is moved rearwardly and downwardly to its lower position, it is positioned substantially at the ground level between the runners 11 and 12.

As hereinbefore stated, the purpose of the present invention is to provide means for depositing bales 21 behind the baling machine in stacked groups suitable for handling by a loading fork. This is accomplished by attaching the sled 10 to the baler so that the completed bales 21 pass from the baler onto the platform 14. An operator is positioned on the platform 14 to receive the bales 21 and stack them on the rack 17, the rack being maintained in raised position. The rack is of such proportions, as shown best in Figure 1, that five bales 21 can be placed thereon side by side. When the operator has placed five bales in this position, he then stacks four more on the top of the first five, and then three on top of the second layer of four, to make a completed stack of twelve bales. This completed stack is transferred to the ground by lowering the rack 17 to the ground level and permitting the bales 21 to slide off as the sled 10 is moved forwardly.

In order to raise and lower the rack 17, a hydraulic cylinder 32 is provided. The cylinder 32 is pivoted to an upstanding lug 33 supported upon the sled 10 beneath the platform 14, and has a piston 34 which is extensible or retractable therefrom. The piston 34 is pivotally connected to an upstanding lug 35 which is rigidly mounted upon the front transverse frame piece 18 of the rack 17. By extending and retracting the piston 34, the operator may raise or lower the rack 17 at will. The cylinder 32, as shown in Figure 4, is a double acting cylinder having fluid lines 36 and 37 connected at its opposite ends. The lines 36 and 37 extend to a control valve 38 mounted beneath the platform 14. The control valve 38 also receives fluid lines 39 and 40 that extend from a pump and a reservoir (not shown) mounted upon and powered by the baler. The valve 38 includes operating levers 41 and 42 which extend upwardly above the platform 14, and which are adapted to be pushed by the operator's feet to raise or lower the rack 17.

In order to assist the cylinder 32 in raising the rack 17, and to prevent undue strain on the cylinder 32 when the loaded rack is being lowered, I provide a pair of springs 43 and 44, each of which is connected at one end to a lug similar to the lug 33 beneath the platform, and each of which is connected to an upstanding ear 45 fixed on the front frame piece 18 of the rack 17. While I have shown the raising and lowering means as a double acting cylinder aided by springs, I do not intend to limit the invention to such devices. It is obvious that other equally operable means may be provided.

As will be seen in Figures 4 and 7, the downward movement of the rack 17 between the runners 11 and 12 must be limited to prevent the cylinder 32 and the springs 43 and 44 from passing over center with respect to the pivotal axes of the stub shafts 28 of the front links 24 and 25, or else rack 17 will be locked in its lowered position. With the device constructed as hereinbefore described, this locking action will not occur, because the rack 17 will engage the ground before dropping low enough to cause the over center locking effect. It is possible, however, that the sled might be passing over a depression in the ground at a time when the rack 17 is lowered, in such a way that the rack would not be stopped at the proper level, and locking could occur. To prevent this, I provide means on the sled runners themselves to limit the downward movement of the rack 17. This means comprises a pair of metal runner straps 46 and 47 secured to the bottom edges of the runners 11 and 12. The straps 46 and 47 are somewhat wider than the runners 11 and 12 and extend inwardly therefrom. The straps 46 and 47 provide ledges which engage the links 24—27 when they are pivoted downwardly, to limit their movement and prevent the rack 17 from dropping too low.

I have found that some means must be provided on the rack 17 to secure the bales 21 thereon against endwise sliding as the sled 10 is moved over the ground surface. If no such means are provided, the jars and vibrations of the sled tend to dislodge those bales 21 which form the lower layer of each group, and cause them to slide on the rods 20. To prevent this, I provide beneath the rack 17, and intermediate its front and rear frame pieces 18 and 19, a cross shaft 48 which has a plurality of upwardly extending tines 49 thereon that extend above the bars 20 to impale the lower layer of bales 21 thereon, and hold them in place. As illustrated in Figures 4–7, the cross shaft 48 is journalled in bearings 50 which are secured to the members 22—23, and is rotatable with respect to the rack 17. At the ends of the shaft 48, depending levers 51 are fixed. The levers 51 are pivoted to lever arms 52 that extend to the front links 24 and 25 and are pivoted thereto a short distance below the sleeves 30. With this construction, movement of the rack 17 in a direction to lower it, causes rotation of the shaft 48 in a direction to pivot the tines 49 downwardly and rearwardly, thereby withdrawing the tines from the bales 21. Thus, when the rack is lowered to the unloading position, the tines 49 are entirely withdrawn from the bales 21, and the bales are free to move rearwardly from the rack 17. The pivotal movement of the tines 49 in a rearward direction as they are withdrawn also tends to slide the bales 21 toward the rear, and assists in the unloading operation.

My improved bunching sled provides an economical and efficient means to gather and deposit bales 21 in convenient groups for handling with a loading fork. The operation of the sled is simple, and the working parts few. To use the sled 10, it is only necessary to couple it behind a baling machine in position to receive bales therefrom, and to provide an operator to stack the bales and raise and lower the rack 17. When the operation is commenced, the rack is raised to the position shown in Figure 1 and held there by the cylinder 33. The operator stacks the bales received from the baler onto the rack 17 until a completed stack is formed. When the stack is complete, he lowers the rack 17 by operation of the cylinder 32. Since the rack 17 remains level while it is being lowered, there is no danger of upsetting the stack of bales. As the rack 17 is lowered, the bales are urged rearwardly by the withdrawal of the tines 49, so when the rack 17 is in its lowermost position, the bales 21 overhang somewhat at the rear, and drag upon the ground. Ground friction then causes the bales 21 to be slid off the rack 17, still in a stack. If for some reason, the bales do not slide clear, the operator may give them a gentle push to start them off. Once the bales are clear, the operator may raise the rack by means of the cylinder 32 and repeat the operation.

It is believed that the nature and advantages of my invention appear clearly from the foregoing.

Having thus described my invention, I claim:

1. A bale bunching sled comprising a pair of spaced apart runners, a raised platform fixed on said runners near the front ends thereof, a horizontal bale supporting rack comprising front and rear transverse frame pieces having their ends terminating inside the runners, and spaced apart longitudinal bale supporting members on said frame pieces adapted to receive bales from said platform, a link connecting each end of each of said frame pieces to the runner, the links being inside the runners and outside the rack, the links being of a length substantially equal to the height of the platform above the runners whereby when upright, they support the rack at the level of the platform, extensible means beneath the platform having one end secured to the sled and the other end to the rack operable to push the rack rearwardly and thereby lower the rack to the ground between the runners, a cross shaft journalled beneath the rack, a plurality of tines fixed on said shaft between said bale supporting members, means connecting said cross shaft to a link operable to rotate the cross shaft between a position holding the tines upright when the rack is at the level of the platform and a position holding the tines extended rearwardly when the rack is lowered to the ground.

2. The invention defined in claim 1 wherein the runners have stop ledges positioned to be engaged by the links to limit the downward movement of the rack.

3. The invention defined in claim 1 with spring means beneath the platform connecting said rack and sled, urging the rack to elevated position at the level of the platform.

References Cited in the file of this patent

UNITED STATES PATENTS

| 435,417 | Gregg | Sept. 2, 1890 |
| 2,552,713 | Flower | May 15, 1951 |
| 2,648,945 | Harrington | Aug. 18, 1953 |
| 2,728,601 | Quigley | Dec. 27, 1955 |

OTHER REFERENCES

Farm Implement and Machinery Review, published June 1, 1956, page 185.